United States Patent [19]
Galbraith

[11] 3,936,600
[45] Feb. 3, 1976

[54] KEYBOARD-PRINTER TERMINAL INTERFACE FOR DATA PROCESSING

[75] Inventor: Robert E. Galbraith, Pontiac, Mich.

[73] Assignee: World Computer Corporation, Birmingham, Mich.

[22] Filed: Aug. 21, 1974

[21] Appl. No.: 499,140

[52] U.S. Cl................................ 178/17.5; 178/3
[51] Int. Cl.² ..................................... H04L 11/00
[58] Field of Search.......... 178/4, 4.1 R, 17.5, 26 R, 178/26 A, 3, 2; 340/172.5, 21, 3, 5

[56] References Cited
UNITED STATES PATENTS

| | | | |
|---|---|---|---|
| 3,453,387 | 7/1969 | Bagley | 178/17.5 |
| 3,646,573 | 2/1972 | Holmes, Jr. | 178/4.1 R |
| 3,701,856 | 10/1972 | Stuck et al. | 178/26 A |

Primary Examiner—Thomas A. Robinson
Attorney, Agent, or Firm—Hauke, Patalidis & Dumont

[57] ABSTRACT

An asynchronous buffered interface for interconnecting a data processing apparatus adapted to communicate in serially coded ASCII data format and a terminal comprising a printer and a keyboard, both of which are adapted for data communication in parallel format.

6 Claims, 2 Drawing Figures

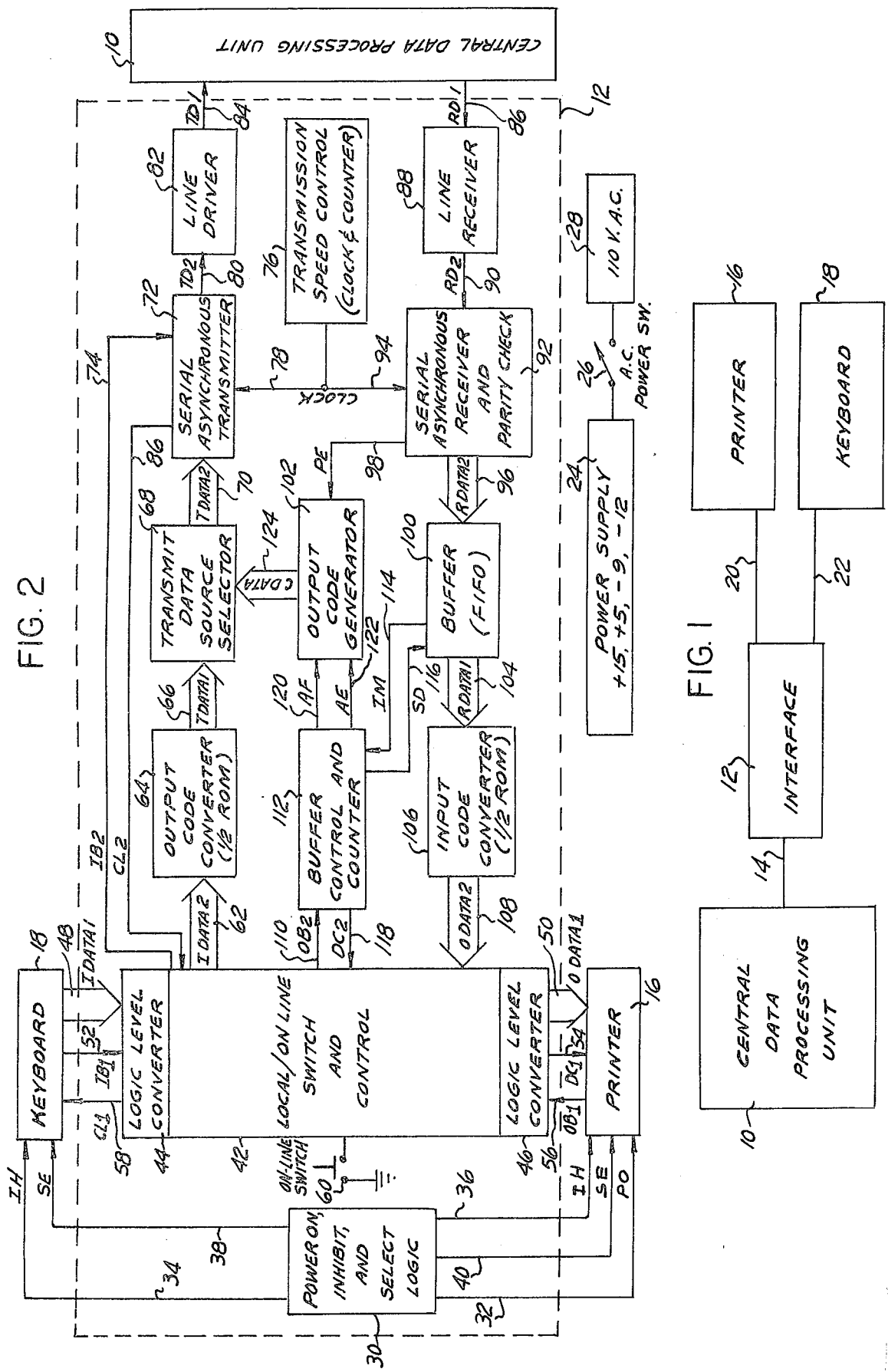

KEYBOARD-PRINTER TERMINAL INTERFACE FOR DATA PROCESSING

BACKGROUND OF THE INVENTION

I. Field of the Invention

This invention relates generally to electronic data processing equipment and specifically to an interface for interconnecting a terminal comprising a printer and a keyboard with a central data processing unit.

II. Description of the Prior Art

Large scale electronic data processing equipment is generally housed in specially prepared buildings and operated by extensive support personnel. Thus, it has become common practice in the data processing industry to provide for the exchange of data information between a number of remotely located data terminals and a central data processing unit. This exchange of data information takes place through long transmission or communication lines, such as telephone lines. In order to provide compatibility throughout many product lines and among many manufacturers, standardized data codes and formates have been established. One of the most widespread codes is ASCII (American Standard Coding Scheme). The data is transmitted serially through the lines as a fixed length time sequence of electronic pulses.

Coded information data can be more rapidly and efficiently transmitted in a parallel data format. For example, rather than transmitting a fixed length time sequence of pulses for each data character, the character may be transmitted simultaneously over a plurality of conductors, each of which corresponds to a time segment of the fixed length time sequence of pulses in a serial data format. An information character coded in ASCII data format and transmitted serially requires, in addition to timing pulses, a signal length seven pulses long. The same data character may be transmitted in a parallel format through seven conductors simultaneously.

Many recently designed pieces of electronic data processing equipment, such as printers and keyboards, have been designed to handle data more efficiently in a parallel data format. Such pieces of electronic data processing equipment are generally not compatible with electronic data processing equipment designed to transmit and receive information data serially. Because of this limitation, the number of applications in which this recently designed equipment may be utilized is greatly restricted.

SUMMARY OF THE INVENTION

The present invention circumvents many of the disadvantages associated with electronic data processing printers and keyboards designed to operate with coded information in a parallel data format. It does so by providing an electronic asynchronous buffered interface circuit between a central data processing unit, which communicates in serially coded ASCII, and a data terminal comprising a printer and a keyboard, both of which are designed to operate with information data in a parallel modified binary coded decimal (BCD) format.

The interface circuit of the invention is operable in both a local and an on-line mode. When operated in the local mode, the interface allows the keyboard to directly control the printer. In the on-line mode, the keyboard communicates with the central data processing unit which in turn controls the printer. Because the rate of transmission of data from the central data processing unit to the interface exceeds the mechanical operating speed of the printer, the interface is provided with a FIFO (first-in-first-out) buffer storage. This buffer storage and its associated control circuitry allow the printer and the central data processing unit to operate independently (asynchronously).

The logic circuitry of the interface is operated at standard TTL (transistor-transistor logic) voltage levels which allows it to be economically constructed from commercially available components. The interface of the invention can be provided with matching networks, if so desired, to properly couple the TTL voltage levels of the interface with the particular signal requirements of the printer, keyboard and telephonic communication lines, for example. If so desired, the interface of the invention can be equipped with its own power supply, or it can be adapted to use part or all of the power supplies for the printer or the keyboard or both.

BRIEF DESCRIPTION OF THE DRAWINGS

The many objects and advantages of the present invention will become apparent to those skilled in the art when the following description of the best mode contemplated for practicing the invention is read in conjunction with the accompanying drawings wherein like reference numerals refer to the same or similar elements, and in which:

FIG. 1 is a block schematic diagram showing the interrelationship of the interface of the invention with a central data processing unit and a terminal comprising a printer and a keyboard; and FIG. 2 is a schematic block diagram showing in greater detail the logic architecture of the invention.

DETAILED DESCRIPTION OF THE PREFERRED EMBODIMENT

Referring now to FIG. 1, a central data processing unit 10 and an interface 12 are shown interconnected via a data transmission line 14. The interface 12 is connected to a printer 16 and a keyboard 18 by means of data transmission lines 20 and 22, respectively. Electronic data information exchanged between the central data processing unit 10 and the interface 12 through the transmission line 14 is in a standardized serially transmitted ASCII data format. With the exception of central control signals, which will be hereinafter described in greater detail, electronic data information is transferred from the keyboard 18 to the interface 12 and from the interface 12 to the printer 16 through the data transmission lines 22 and 20, respectively, in a parallel, modified BCD (binary coded decimal) data format.

FIG. 2 shows the architecture of the data terminal of the invention and indicates the flow of data and control signals between various functional components which are represented schematically. The data terminal comprises a keyboard 18, a printer 16, an interface 12 and a power supply 24. When the power supply 24 is turned on by closing a switch 26 which connects a 110 volt AC source of power 28 to the power supply, the power supply supplies regulated DC voltages for the operation of the keyboard 18, the interface 12 and the printer 16. The operation of the switch 26 is controlled by a controller 30 which, when activated, also provides a control signal PO in a line 32 to the printer 16, causing 110 volts AC line voltage to be made available to the printer motor. The controller 30 also generates a signal IH which is carried through lines 36 and 34 to the printer 16 and to the keyboard 18, respectively, initializing and enabling their control. The controller 30 further generates a select logic signal SE which is supplied by the lines 38 and 40 to the keyboard 18 and the printer 16, respectively, setting them to a "ready" state.

The interface 12 is capable of operating in both a local and an on-line mode. For that purpose, it is provided, between the keyboard 18 and the printer 16, with a local/on-line switch and control means 42. The keyboard 18 and the printer 16 of the example of structure illustrated at FIG. 2 operate at signal voltage levels which are not directly compatible with the TTL (transistor-transistor logic) voltage levels which are used in the interface 12. For that reason, logic level converters, represented schematically at 44 and 46, are provided for matching the signal characteristics of the keyboard 18 and of the printer 16 with standardized TTL voltage levels.

With the interface operating in the local mode, the depression of a key on the keyboard 18 results in the generation of a signal IDATA1 corresponding to the depressed key in a modified BCD (binary coded decimal) data format. The signal IDATA1 is in a parallel data format which is indicated by a double lined arrow 48. The signal IDATA1 is processed through the logic level converter 44 where the signal level is modified to be compatible with standard TTL voltage levels. This signal then proceeds directly through the switch and control means 42 and is reconverted by the logic level converter 46 into a signal which is compatible with the printer 16. This signal, denoted by ODATA1, is carried by a plurality of lines 50 which interconnect the logic level converter 46 to the printer 16. After a delay, a signal IB1 comes up at the keyboard and is carried by a line 52 to the logic level converter 44, through the switch and control means 42 to the logic level converter 46 and is supplied by a line 54 as a signal DC1 to the printer 16. This signal DC1 informs the printer 16 that a signal ODATA1 is available and ready to be executed. When the printer 16 begins to execute the signal ODATA1, a printer output busy control signal OB1 goes high and is carried by a line 56 to the logic level converter 46 where it is processed to a TTL level signal. The signal OB1 comes down when the printer 16 has finished executing ODATA1 and is available for the next command. Coming down, OB1 causes the switch and control means 42 to generate a keyboard clear signal CL1 which is supplied through a line 58 from the logic level converter 44 to the keyboard 18 to indicate that the previous keyboard data IDATA1 has been read, which in turn causes the keyboard 18 to bring the control signal IB1 down, allowing the recognition of the next key depression.

The local/on-line function mode selector is shown schematically as a switch 60. When the switch 60 is closed, the interface 12 is operating in the on-line mode. The depression of a key on the keyboard 18 again results in IDATA1 through the lines 48 and to the logic level converter 44, where the signal is converted to TTL voltage levels, being fed into the local/on-line switch and control means 42 to be supplied by lines 62 as a signal IDATA2 to an output code converter 64.

The signal IDATA2 is a seven-bit modified BCD character which is the same as IDATA1 except that it is at TTL voltage levels. To provide for compatibility with the central data processing unit 10, the modified BCD character IDATA2 is converted into a seven-bit ASCII character TDATA1 in the output code converter 64 which consists of a read only memory (ROM) well known in the art and which provides a preprogrammed one-to-one correspondence between seven-bit modified BCD characters and seven-bit ASCII characters. The signal TDATA1 is supplied by a plurality of lines 66 from the output code converter 64 to a transmit data source selector 68, the operation of which will be described in greater detail hereinafter. The signal TDATA2 is the same as the signal TDATA1 and is carried by the lines 70 to a serial asynchronous transmitter 72. When the system is operating in the on-line mode, the signal IB1, generated by the keyboard 18 shortly after a key is depressed, appears as a signal IB2 in a line 74 and enables the serial asynchronous transmitter 72 to transfer the signal TDATA2 to an interim buffer, included in the transmitter 72, for later serial transmission. The rate at which the seven-bit ASCII character TDATA2 is transmitted in serial data format as a fixed length time sequence of pulses for each data character is controlled by a transmission speed control schematically shown at 76 which provides timing or clock pulses through a line 78 to the serial asynchronous transmitter 72.

The output signal TD2 from the serial asynchronous transmitter 72, which is also at TTL voltage level, being transmitted over standard telephone communication lines, must be further processed to be compatible with the signal requirements of the transmission line. For that purpose, the signal TD2 from the serial asynchronous transmitter 72 is supplied via a line 80 to a line driver 82. The signal TD1 at the output of the line driver 82 is fed into a telephone communication line 84 which connects with the central data processing unit 10.

After a character has been accepted by the buffer portion of the serial asynchronous transmitter 72, a signal CL2 generated by the control circuitry of the serial asynchronous transmitter is supplied via a line 86 to the local/on-line switch and control 42, which results in the keyboard clear signal CL1 in the line 58 being supplied to the keyboard 18. As previously explained, the keyboard clear signal CL1 brings down the signal IB1 in the line 52 which allows the recognition of the next key depression.

The central data processing unit 10 is programmed to echo the signal TD1 back to the interface 12 for execution by the printer 16. The echoed signal, denoted RD1, is fed from the central data processing unit via a telephonic communication line 86. The line receiver 88 converts the signal RD1, which is at a signal level compatible with the requirements for transmission through the telephone line, to a signal RD2 which is at standardized TTL voltage levels. This signal RD2 is an ASCII data character in serial format which is supplied via a line 90 to a serial asynchronous receiver 92 including a parity check. The rate at which the serial asynchronous receiver 92 accepts the signal RD2 is controlled by the transmission speed control 76 which provides timing or clock pulses to the serial asynchronous receiver 92 through a line 94. The receiver 92 converts the signal RD2 to a signal RDATA2 which is an ASCII data character in parallel data format. The signal RDATA2 is conveyed through a plurality of lines 96 from the serial asynchronous receiver 92 to a FIFO (first-in-first-out) buffer storage 100. As the signal RD2 is being received and converted to the signal RDATA2 in the serial asynchronous receiver 92, the parity of the signal is checked to detect the presence of a character transmission error. In the event that such an error is detected, a signal PE is generated by the serial asynchronous receiver 92 which is supplied by a line 98 to an output code generator 102.

The buffer storage 100 has, for example, a maximum capacity of 16 ASCII data characters. These characters are stored in the same sequence in which they are received and, at the appropriate time, appear as a signal RDATA1 which is fed through a plurality of lines 104 to an input code converter 106. Like its counterpart, the output code converter 64, the input code converter 106 comprises a read only memory containing a preprogrammed 1-to-1 correspondence between a seven-bit ASCII character and a seven-bit modified BCD character. The seven-bit modified BCD output character signal ODATA2 is carried by a plurality of lines 108 from the output of the input code converter 106 to the local/on-line switch and control means 42. The signal ODATA2, after being processed by the logic level converter, emerges via the plurality of lines 50 as the signal ODATA1 which is compatible with the operation of the printer 16.

As previously mentioned, a signal OB1 in the line 56 is provided by the printer 16 when available for the next command. The signal OB1 into the local/on-line switch and control means 42 provides a signal OB2 in a line 110 to operate a buffer storage control 112. Each time a data character RDATA2 is received by the buffer storage 100 a signal IM is generated by the buffer storage 100 and conveyed by a line 114 to the buffer storage control 112. Each signal IM causes a counter in the buffer storage control 112 to count up. This same counter counts down each time a data character RDATA1 is processed through the printer 16 and a signal OB2 appears in line 110. Therefore, the buffer storage control 112 knows at all times how many data characters RDATA2, waiting to be printed, are stored in the buffer storage 100. When the counter of the buffer storage control 112 indicates that a data character is available in the buffer storage 100 for processing, the buffer storage control 112 checks whether the printer 16 is available for printing, such availability being represented by the presence of the signal OB2 on line 110. If both the printer 16 is available and there is a data character to be printed stored in the buffer storage 100, the buffer storage control 112 generates a signal SD which through a line 116 causes the buffer storage 100 to transfer the next data character as RDATA1 in line 104 into the input code converter 106. The signal emerges in line 108 as ODATA2 and in line 50 as ODATA1 for storage in the buffer of the printer 16. A short time later the buffer storage control 112 generates a signal DC2 in the line 118 into the local/on-line switch and control means 42. The signal DC2, processed through the logic level converter 46, emerges as the signal DC1 in the line 54, telling the printer 16 to execute the character ODATA1. The signal DC2 persists in the line 118 until it is brought down by the buffer storage control 112 upon receiving the signal OB2 indicating that the printer 16 is available for the next command.

Since the central data processing unit 10 may tend to send characters faster than the printer 16 can print, provisions are included for handling a buffer full situation. As the FIFO buffer storage 100 is filled by the central data processing unit 10, the buffer storage control 112 generates an almost-full signal AF which, through a line 120, is supplied to the output code generator 102 which in turn generates an ASCII control character CDATA in parallel data format. The signal CDATA is supplied by a plurality of lines 124 to the transmit data source selector 68, which in turn causes the signal CDATA to be transmitted to the central data processing unit 10, telling the unit to stop further transmission of data. As the FIFO buffer storage empties, the buffer storage control circuitry generates an almost-empty signal AE, which is supplied through a line 122 to the output code generator 102. The output code generator 102, by means of a different CDATA signal transmitted to the central data processing unit 10 by the transmit data source selector 68, tells the central data processing unit 10 to resume the transmission of data.

Should a parity error be detected in the parity checking portion of the serial asynchronous receiver 92, as previously mentioned, a signal PE appears in the line 98 and through the output code generator 102 and the data source selector 68 is transmitted to the central data processing unit 10 indicating that a parity error has occurred and that further transmission of data characters is to be terminated.

It will be appreciated that the present invention is particularly well adapted to provide an interface between a keyboard, such as the Model-11 Litton keyboard, and a printer, such as the Model-30 Litton printer, for local mode operation, whereby the printer is directly actuated from the keyboard, and for on-line mode operation, whereby a remotely located central data processing unit receives its instructions from the keyboard, such instructions being echoed back from the data processing unit to the printer for display and check of the correctness of the instructions, and for displaying by way of the printer the resulting data provided by the central data processing unit. The individual elements forming the interface system of the invention are available on the market, as will be readily apparent to those skilled in the art, and the serial asynchronous transmitter and the serial asynchronous receiver and parity check may consist of separate elements, as illustrated, or they may consist of a single unit such as the Model AY-5-1012 Universal Asynchronous Receiver-Transmitter.

While it will be apparent to those skilled in the art that the preferred embodiment of the invention disclosed is well designed to fulfill the objects above stated, it will be appreciated that the present invention is susceptible to modification, variation and change without departing from the proper scope or fair meaning of the claims.

What is claimed is:

1. An interface for interconnecting a terminal comprising a keyboard and a printer to a data processing apparatus, said keyboard and printer being adapted for data communication in parallel code and said data processing apparatus being adapted for data communication in serial code, said interface comprising control means for placing said keyboard and printer in direct communication with each other in a first mode of operation and in communication with said data processing apparatus in a second mode of operation, serial asynchronous transmitter means for converting said data from parallel to serial code and for supplying said serial coded data to said data processing apparatus through a first transmission line, transmit data source selector means for supplying command data to said data processing apparatus, serial asynchronous receiver means for converting data received from said data processing apparatus through a second transmission line from serial to parallel code, buffer storage means for storing said received data and for supplying said stored data to said printer, storage control means for controlling said buffer storage to supply said stored data to said printer only when said printer is in a ready state and up-down counter means for controlling said transmit data source selector means for commanding said data processing apparatus through said first transmission line to stop transmission when said buffer storage means is nearly full and to resume transmission when said buffer storage means is nearly empty.

2. The interface of claim 1 further comprising parity check means dependent from said asynchronous receiver means, said parity check means being adapted to provide a parity error signal upon occurrence of a parity error in said received data, and means for controlling said transmit data source selector means for sending through said first line a command signal controlling said data processing apparatus to stop transmission upon occurrence of said parity error signal.

3. The interface of claim 2 wherein said data processing apparatus echoes through said second transmission line the data supplied through said first transmission line.

4. The interface of claim 1 further comprising clock means for timing of said serial asynchronous transmitter for supplying said serial coded data to said data processing apparatus at a predetermined rate.

5. The interface of claim 1 further comprising line driver means between said asynchronous transmitter and said first transmission line and line receiver means between said second transmission line and said asynchronous receiver.

6. The interface of claim 1 further comprising first parallel code to parallel code converter means between said control means and said serial asynchronous transmitter means for converting data from a first parallel code format to a second parallel code format, a second parallel code to parallel code converter means between said serial asynchronous receiver and said control means for converting data for said second parallel code format to said first parallel code format, said keyboard and printer being compatible with said first parallel code format and said transmitter and receiver being compatible with said second parallel code format.

* * * * *